US007778951B2

(12) United States Patent
Gilbert et al.

(10) Patent No.: US 7,778,951 B2
(45) Date of Patent: Aug. 17, 2010

(54) EFFICIENT CONSTRUCTION OF QUANTUM COMPUTATIONAL CLUSTERS USING HADAMARD ROTATIONS

(75) Inventors: Gerald N. Gilbert, Manalapan, NJ (US); Michael D. Hamrick, Eatontown, NJ (US); Yaakov S. Weinstein, East Brunswick, NJ (US)

(73) Assignee: The Mitre Corporation, McLean, VA (US)

( * ) Notice: Subject to any disclaimer, the term of this patent is extended or adjusted under 35 U.S.C. 154(b) by 611 days.

(21) Appl. No.: 11/882,546

(22) Filed: Aug. 2, 2007

(65) Prior Publication Data
US 2008/0035911 A1 Feb. 14, 2008

Related U.S. Application Data

(60) Provisional application No. 60/834,798, filed on Aug. 2, 2006.

(51) Int. Cl.
G06F 17/00 (2006.01)
(52) U.S. Cl. .......................................... 706/45; 706/62
(58) Field of Classification Search .................. 706/45, 706/62
See application file for complete search history.

(56) References Cited

U.S. PATENT DOCUMENTS

| 7,219,017 | B2 * | 5/2007 | Vitaliano et al. | 702/19 |
| 7,554,080 | B2 * | 6/2009 | Munro et al. | 250/251 |
| 2004/0024750 | A1 * | 2/2004 | Ulyanov et al. | 707/3 |

OTHER PUBLICATIONS

Turchette et al., "Measurement of Conditional Phase Sifts for Quantum Logic", *Physical Review Letters*, vol. 75, No. 25, Dec. 18, 1995, pp. 4710-4713.
Nielsen, Michael A., "Optical Quantum Computation Using Cluster States" *Physical Review Letters*, The American Physical Society, vol. 93, No. 4, Jul. 23, 2004, 040503, 4 pgs.
Raussendorf et al., "A One-Way Quantum Computer", *Physical Review Letters*, The American Physical Society, vol. 86, No. 22, May 28, 2001, pp. 5188-5191.
Raussendorf et al., "Measurement-Based Quantum Computation on Cluster States", *Physical Review A*, The American Physical Society, Third Series, vol. 68, No. 2, 022312, 2003, 32 pgs.
Briegel et al., "Persistent Entanglement in Arrays of Interacting Particles", *Physical Review Letters*, vol. 86, No. 5, pp. 910-913, Jan. 29, 2001.
G. Gilbert et al., "A Theory of Physical Quantum Computation: The Quantum Computer Condition", *arXiv:quant-ph/0507141 v2*, Jul. 20, 2005, 43 pgs.
Browne et al., "Resource-Efficient Linear Optical Quantum Computation", *Physical Review Letters*, The American Physical Society, vol. 95, No. 1, 010501, Jul. 1, 2005, 4 pgs.

(Continued)

*Primary Examiner*—David R Vincent
(74) *Attorney, Agent, or Firm*—Sterne, Kessler, Goldstein & Fox P.L.L.C.

(57) ABSTRACT

A method of creating two-dimensional quantum computational cluster states is demonstrated that is considerably more efficient than previously proposed approaches. The method uses local unitaries and type-I fusion operations. The increased efficiency of the method compared to previously proposed constructions is obtained by identifying and exploiting local equivalence properties inherent in cluster states.

19 Claims, 8 Drawing Sheets

OTHER PUBLICATIONS

Duan et al., "Efficient Quantum Computation with Probabilistic Quantum Gates", *Physical Review Letters*, The American Physical Society, vol. 95, No. 8, Aug. 19, 2005, 080503, 4 pgs.

Chen et al., "Efficient Construction of 2-D Cluster States with Probabilistic Quantum Gates", *arXiv:quant-ph/0507066 v3*, Sep 14, 2005, 5 pgs.

Walther et al, "Experimental One-way Quantum Computing", *Nature*, vol. 434, Mar. 10, 2005, pp. 169-176.

Kiesel et al., "Experimental Analysis of a Four-Qubit Photon Cluster State", *Physical Review Letters*, The American Physical Society, vol. 95, No. 21, Nov. 18, 2005, 210502, 4 pgs.

Zhang et al., "Experimental Construction of Optical Multi-qubit Cluster States From Bell States", *arXiv:quant-ph/0501036 v1*, Jan 9, 2005, 4 pgs.

Heim, et al., "Multiparty Entanglement in Graph States," *Physical Review A*, The American Physical Society, vol. 69, No. 6, 062311, Jun. 2004, 20 pgs.

Knill et al., "A Scheme for Efficient Quantum Computation with Linear Optics" *Nature*, vol. 409, Issue No. 6816, Jan. 4, 2001, pp. 46-52.

Lim et al., "Repeat-Until-Success Quantum Computing Using Stationary and Flying Quibits", *arXiv:quant-ph/0508218v3*, Nov. 2, 2005, 14 pgs.

Gilbert et al., "Efficient Construction of Photonic Quantum Computational Clusters," *arXiv:guant-ph/0512110 v1*, Dec. 14, 2005, 4 pgs.

\* cited by examiner

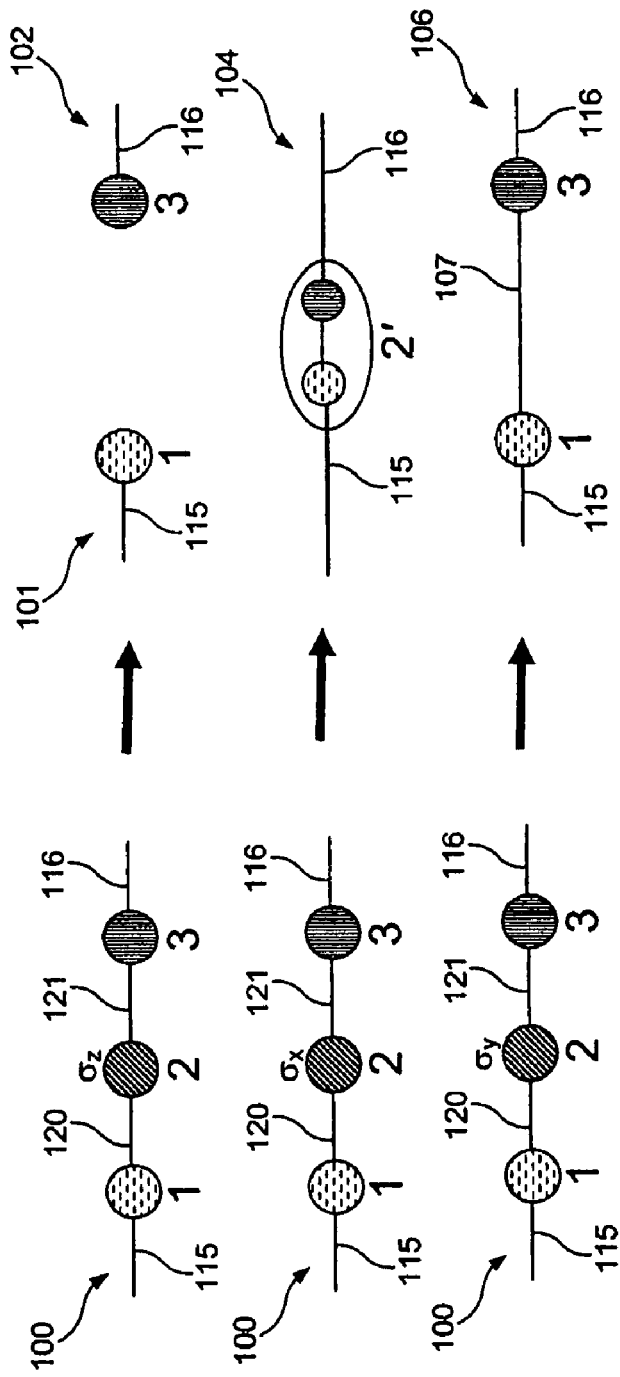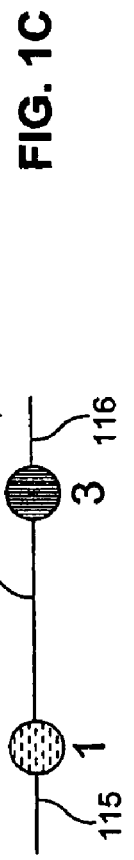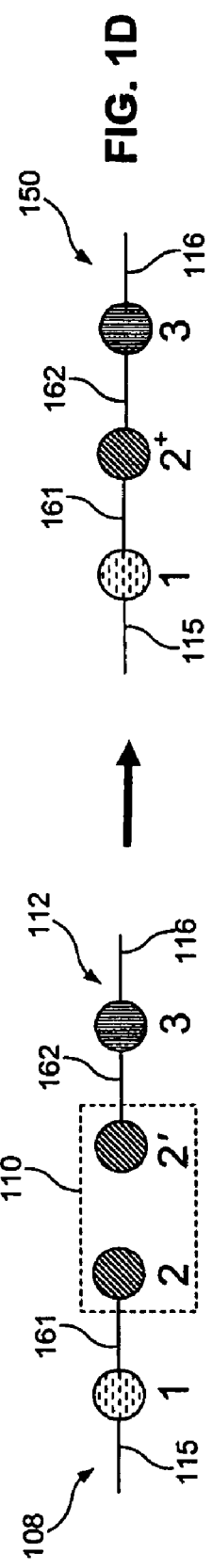

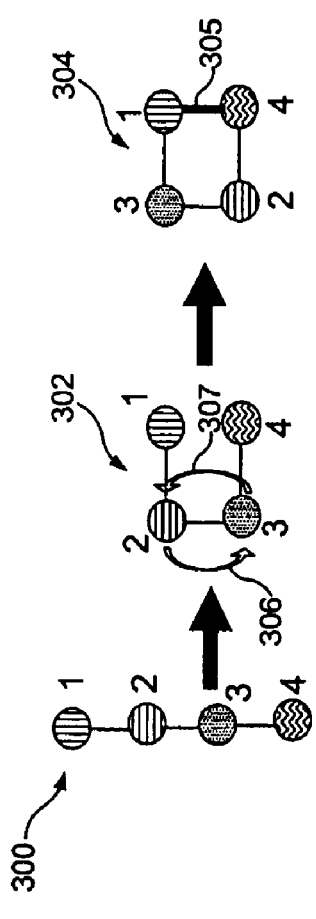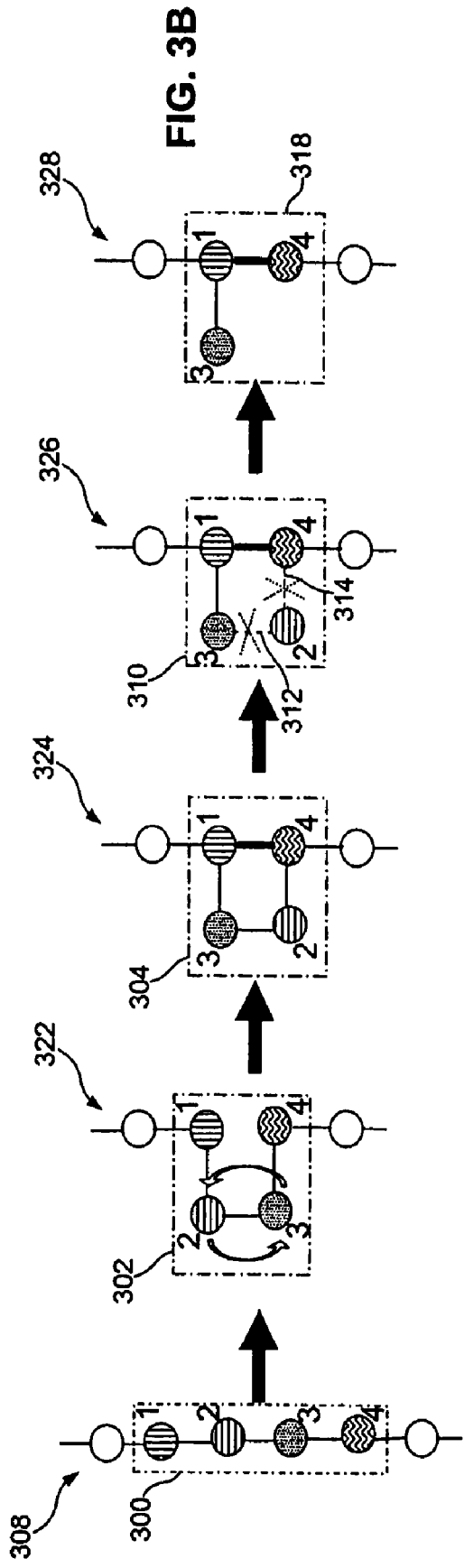

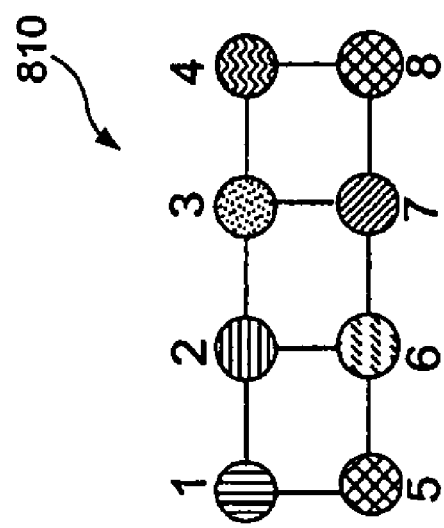
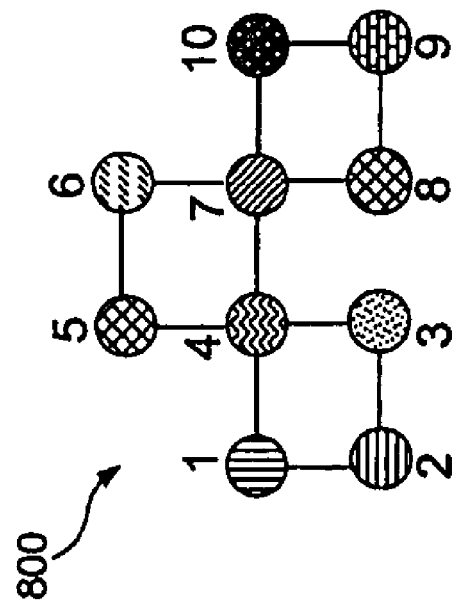
FIG. 8

EFFICIENT CONSTRUCTION OF QUANTUM COMPUTATIONAL CLUSTERS USING HADAMARD ROTATIONS

CROSS-REFERENCE TO RELATED APPLICATIONS

The present application claims the benefit of U.S. Provisional Patent Application No. 60/834,798, filed on Aug. 2, 2006, which is incorporated herein by reference in its entirety.

BACKGROUND OF THE INVENTION

1. Field of the Invention

The present invention relates generally to the field of quantum information processing, and more specifically to efficient quantum computation.

2. Related Art

Quantum computation (QC), including photonic QC, has received significant attention in recent years. Initial work on photonic QC considered different circuit-based approaches. In the circuit-based QC paradigm, including circuit-based photonic QC, computation is effected by transforming an input state into an output state by applying a suitable sequence of logic gates, comprising a computational circuit, to quantum computational units known as qubits (derived from quantum bits). An example of such a logic gate is a CNOT gate. The CNOT gate is paradigmatic of a type of gate that is required in quantum computation, in which the qubits can be made to become entangled with each other. (Entanglement is a uniquely quantum mechanical phenomenon that plays a crucial role in quantum computation.) Such a logic transformation (i.e., a gate) can only be realized by using a mechanism by which qubits interact.

Photonic QC utilizes particular quantum states of photons as qubits. From a hardware perspective, photons are easy to move around in optical fiber, making the use of (states of) photons as qubits more convenient in this sense than other choices of physical realizations of qubits. The choice of photons as qubits motivated the choice of nonlinear Kerr-type media in the first analyses of photonic QC, as discussed in the article by Q. A. Turchette, C. J. Hood, W. Lange, H. Mabuchi, and H. J. Kimble, in *Phys. Rev. Lett.*, 75:4710 (1995), which is incorporated by reference in its entirety. Although this approach in principle enables photonic entangling gates, practical difficulties associated with the use of Kerr-type media made this method problematic.

Interest in photonic QC was renewed with the appearance of the work of Knill, Laflamme and Milburn (KLM), as described in the article by E. Knill, R. Laflamme, G. J. Milburn, in *Nature* (London) 409:46 (2001), which is incorporated by reference in its entirety. This approach makes use of linear optics, combined with measurements carried out on ancillary photons, in order to circumvent the difficulties associated with the use of nonlinear media. Although it avoids the use of nonlinear media, the KLM approach to linear optics quantum computation (LOQC) is nevertheless problematic due to the inefficiency associated with the necessity of dealing with extremely large numbers of ancillary photons, as discussed in the article by M. A. Nielsen, in *Phys. Rev. Lett.* 93:040503 (2004), which is incorporated by reference in its entirety.

Both the non-linear approach and the linear approach in photonic QC are formulated within the circuit-based paradigm. An alternative to the circuit-based approach is a cluster-based approach that evolved later. A cluster comprises multiple entangled qubits, constructed in such a way as to enable universal quantum computation, effected solely by suitable measurements performed on the constituents of the cluster. Cluster states are discussed in several references, such as R. Raussendorf and H. J. Briegel, *Phys. Rev. Lett.* 86:5188 (2001), R. Raussendorf, D. E. Browne, and H. J. Briegel, *Phys. Rev. A* 68:022312 (2003), H. J. Briegel and R. Raussendorf, *Phys. Rev. Lett.*, 86:910, (2001), all of which are incorporated herein by reference in their entireties. With the discovery of the cluster-based paradigm, the possibility of using photons as the nodes in a cluster was explored.

Note that both circuit-based and cluster-based paradigms are unified in a framework provided by G. Gilbert et al. in "A Theory of Physical Quantum Computation: The Quantum Computer Condition", *quant-ph/0507141*), which is incorporated by reference in its entirety.

It has been observed that a photonic cluster may furnish a more efficient realization of a quantum computation than a photonic circuit if certain techniques from LOQC were used to build the photonic cluster (as opposed to directly executing the computation itself), as discussed in the article by M. A. Nielsen in *Phys. Rev. Lett.* 93:040503 (2004), which is incorporated by reference in its entirety. Daniel E. Browne and Terry Rudolph refined this idea, and presented a more efficient scheme for the construction of photonic clusters in the article titled "Resource-Efficient Linear Optical Quantum Computation", published in *Phys. Rev. Lett.* 95:010501 (2005), which is incorporated by reference in its entirety.

In Browne and Rudolph's scheme, the suggestion of Nielsen to use LOQC-derived operations to construct a cluster is replaced by a proposal to use simpler "fusion" operations to construct a cluster. However, while type-I fusion operations are relatively cost-effective, Browne and Rudolph also require use of resource-costly type-II fusion operations, leaving room for the exploration of a more efficient cluster construction method.

Note that a number of additional methods for constructing clusters have been suggested, for example, in the articles by L. M. Duan, R. Rausendorff, in *Phys. Rev. Lett.*, 95, 080503 (2005), and by Q. Chen, J. Cheng, K. L. Wang, J. Du, in *Phys. Rev. A*, 73, 012303 (2006), both of which are incorporated by reference in their entireties. Additionally, small photonic cluster states have been experimentally implemented, as reported, for example, in the articles by P. Walther et al, in *Nature* 434:169 (2005), by N. Kiesel, C. Schmidt, U. Weber, O. Guhne, G. Toth, R. Ursin, H. Weinfurter, in *Phys. Rev. Lett.* 95:210502 (2005), and by A-N. Zhang, C-Y. Lu, X-Q. Zhou, Y-A. Chen, Z. Zhao, T. Yang, and J-W. Pan, in *Phys. Rev. A*, 73, 022330 (2006), all of which are incorporated herein by reference in their entireties. However, none of the references provide an efficient method for creating building block clusters for universal quantum computation, where the clusters are formed using minimal number of intermediate transformation steps.

Thus, what is needed is an improved method for efficiently constructing generic quantum computational clusters, including but not limited to, photonic clusters, as building blocks for universal quantum computation so as to minimize the use of resources.

SUMMARY OF THE INVENTION

The invention described herein includes a method of creating two-dimensional quantum computational cluster states. This method is considerably more efficient than previously proposed approaches. The method makes use of local unitaries and type-I fusion operations. The increased efficiency of the method compared to previously proposed constructions is obtained by identifying and exploiting local equivalence properties inherent in cluster states.

In an embodiment of the invention, a method of constructing an L-shaped two-dimensional quantum computational cluster which provides the basis for constructing cluster architectures suitable for carrying out universal QC is discussed. The method comprises the steps of: selecting four consecutive qubits from a linear chain; constructing a 2×2 box cluster by applying Hadamard rotations to the second qubit and the third qubit, followed by applying a swap operation between the second qubit and the third qubit, thereby effectively creating a bond between the first qubit and the fourth qubit; and measuring (along the z-axis of the Bloch sphere, where the Bloch sphere is a geometrical representation of the pure state space of a multi-level quantum mechanical system) the second qubit thereby deleting bonds between the second qubit and the third qubit, and between the second qubit and the fourth qubit.

In another embodiment, a method of constructing a cross-shaped two-dimensional quantum computational cluster suitable for carrying out universal QC is discussed. The method comprises the steps of: selecting seven consecutive qubits from a linear chain; constructing a first 2×2 box cluster containing the first four qubits by applying Hadamard rotations to the second qubit and the third qubit, followed by applying a swap operation between the second qubit and the third qubit, thereby effectively creating a bond between the first qubit and the fourth qubit; constructing a second 2×2 box cluster containing the fourth, fifth, sixth, and seventh qubits by applying Hadamard rotations to the fifth qubit and the sixth qubit, followed by applying a swap operation between the fifth qubit and the sixth qubit, thereby effectively creating a bond between the seventh qubit and the fourth qubit, wherein the second 2×2 box cluster and the first 2×2 box cluster are graphically isomorphic diagonal mirror images of each other with the third qubit and the fifth qubit diametrically opposite to each other; removing the third qubit by performing a measurement along the z-direction, and removing the fifth qubit by performing a measurement along the z-direction. These measurements have the effect of deleting the bonds between the third qubit and the second qubit, between the third qubit and the first qubit, between the fifth qubit and the sixth qubit, and between the fifth qubit and the seventh qubit, respectively.

In yet another embodiment, a method of constructing a sideways H-shaped two-dimensional quantum computational cluster suitable for carrying out universal QC is discussed. The method comprises the steps of: selecting four consecutive qubits from a first linear chain; constructing a first 2×2 box cluster by applying Hadamard rotations to the second qubit and the third qubit, followed by applying a swap operation between the second qubit and the third qubit, thereby effectively creating a bond between the first qubit and the fourth qubit; removing the second qubit by deleting bonds between the second qubit and the third qubit and the second qubit and the fourth qubit; selecting another set of four consecutive qubits (referred to as the fifth, sixth, seventh, and eighth qubits) from a second linear chain; constructing a second 2×2 box cluster containing the fifth qubit, the sixth qubit, the seventh qubit, and the eighth qubit by applying Hadamard rotations to the sixth qubit and the seventh qubit, followed by applying a swap operation between the sixth qubit and the seventh qubit, thereby effectively creating a bond between the fifth qubit and the eighth qubit; removing the sixth qubit by deleting bonds between the sixth qubit and the seventh qubit, and between the sixth qubit and the eighth qubit; and applying a type-I fusion operation to fuse the third qubit and the seventh qubit. If the fusion operation fails, the method repeats all the above steps until a successful sideways H-shaped cluster is formed.

The steps of the above methods may happen in an order other than what is described above, and some of the steps may occur simultaneously, as will be understood easily by persons skilled in the art.

The L-shaped, cross-shaped, and H-shaped clusters are used as a building blocks to create arbitrarily shaped larger computational clusters by applying appropriate measurements, including $\sigma_z$ and $\sigma_y$ measurements, and fusion operations, including type-I fusion.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the relevant art to make and use the invention.

FIGS. 1A-1C illustrate how certain measurements on a particular cluster qubit transform the remaining qubits into a new cluster state with a different layout.

FIG. 1D illustrate an example of how two cluster states can be joined together by fusing qubits from each of the clusters.

FIGS. 3A-3B show different steps for constructing an L-shaped cluster, according to an embodiment of the present invention.

Figure 6:
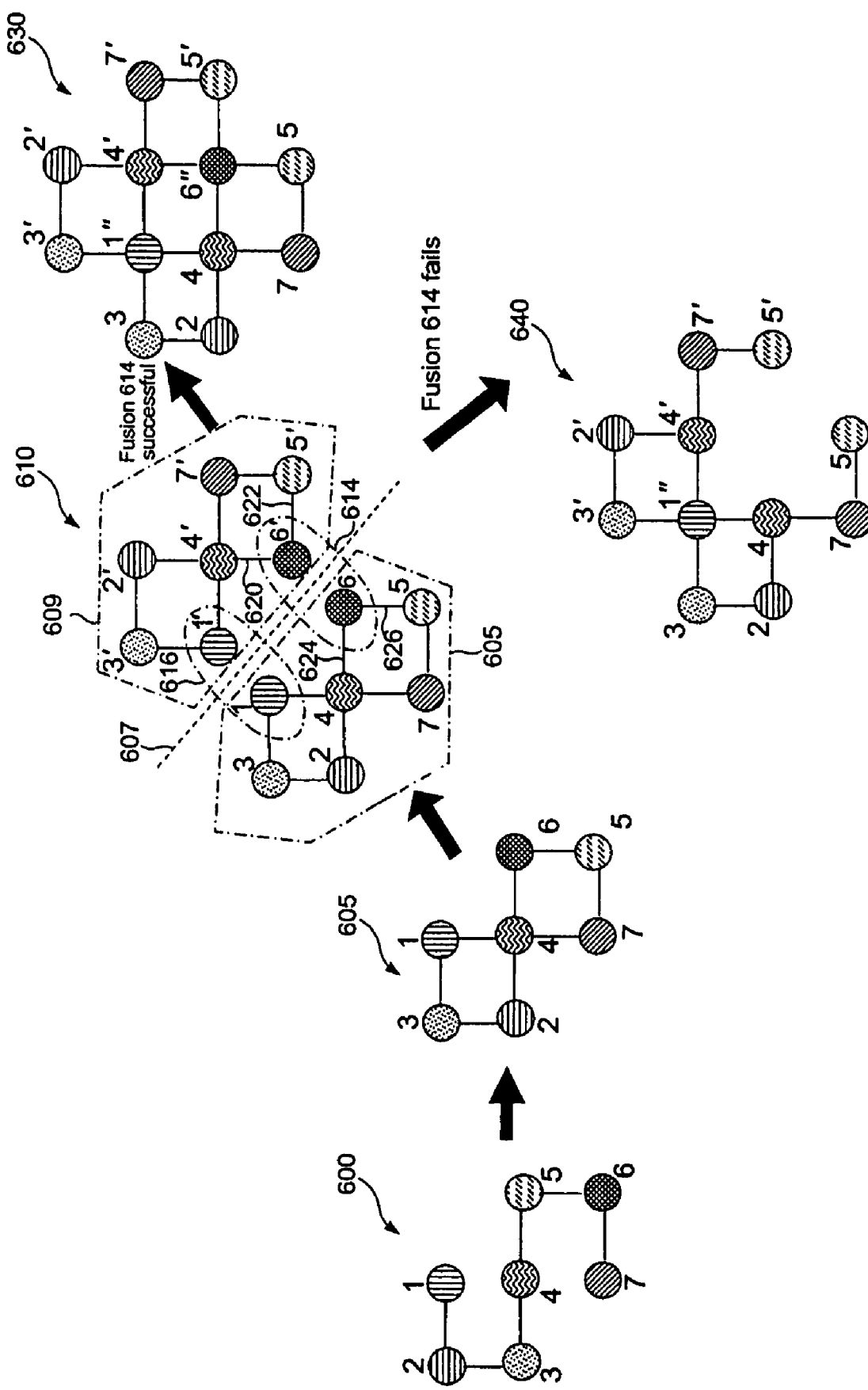
Figure 7:
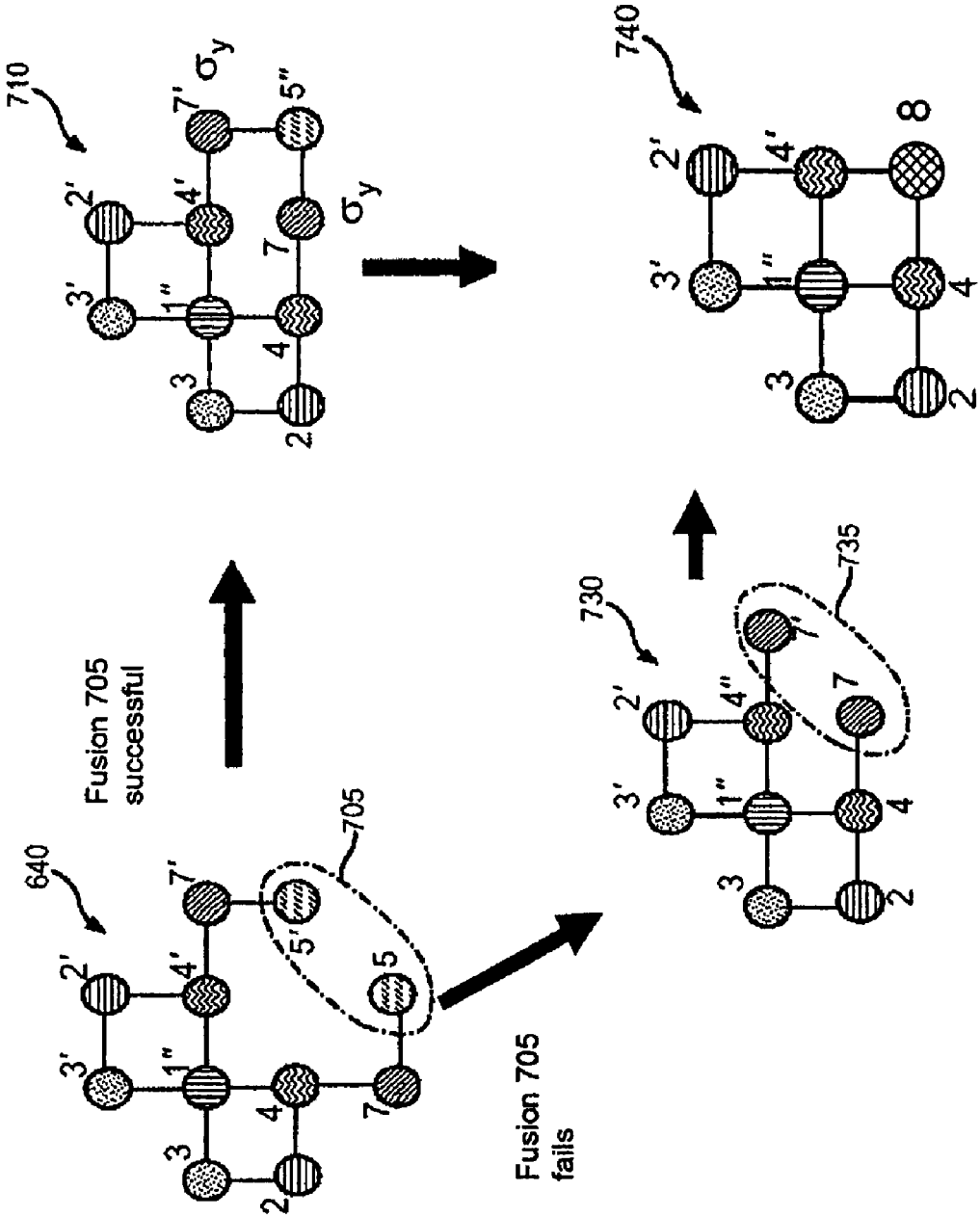

FIGS. 6, 7, and 8 show representative cluster shapes illustrating the generality and flexibility of the efficient cluster construction method, according to embodiments of the present invention.

The present invention will be described with reference to the accompanying drawings. The drawing in which an element first appears is typically indicated by the leftmost digit(s) in the corresponding reference number.

DETAILED DESCRIPTION OF THE INVENTION

Table of Contents

I. Overview
   A. Unitaries and Graph States in Universal QC
   B. Single-Qubit Measurement and Fusion of Cluster States II. Formation of Example Two-Dimensional Basic Clusters
   A. Formation of L-Shape
   B. Formation of Cross-Shape
   C. Formation of Sideways H-Shape III. Formation of Larger Arbitrarily-Shaped Clusters IV. Conclusion

I. Overview

While specific configurations and arrangements are discussed, it should be understood that this is done for illustrative purposes only. A person skilled in the relevant art will recognize that other configurations and arrangements can be used without departing from the spirit and scope of the present invention. It will be apparent to a person skilled in the relevant art that this invention can also be employed in a variety of other applications.

A. Unitaries and Graph States in Universal Quantum Computation

A universal computer comprises a universal set of logic gates capable of handling an all-inclusive set of logic transformations by altering the inputs and interconnections of the logic gates without having to modify the physical configuration of the machine. In classical information theory, the concept of the universal computer can be represented by several equivalent models, corresponding to different scientific approaches. From a mathematical point of view, a universal computer is a machine capable of calculating partial recursive functions. The equivalent in QC to partial recursive functions are unitary operators. As every classically computable problem can be reformulated as calculating the value of a partial recursive function, each quantum computation must have a corresponding unitary operator.

In functional analysis, a unitary operator is a bounded linear operator U on a Hilbert space satisfying $$U^*U=UU^*=I$$

where U* is the adjoint of U, and I is the identity operator. U preserves the inner product on the Hilbert space, so that for all vectors x and y in the Hilbert space, $$\langle Ux, Uy\rangle = \langle x,y\rangle.$$

Thus, unitary operators are isomorphisms between Hilbert spaces, i.e., they preserve the structure (in this case, the linear space structure, the inner product, and hence the topology) of the spaces.

Isomorphism is a mathematical concept related to graph theory. Informally, an isomorphism is a kind of mapping between objects, which shows a relationship between two properties or operations. If there exists an isomorphism between two structures, the two structures are called isomorphic. In a certain sense, isomorphic sets are structurally identical.

A collection of entangled quantum mechanical systems, the state operators of which exhibit discrete eigenvalues, may be represented by a graph. The vertices of the graph correspond to the above-mentioned quantum mechanical systems, and the edges, or "bonds," connecting the vertices, represent the existence of entanglement correlations between the various systems. The basis for this approach is discussed in the article titled, "Multiparty entanglement in graph states," by M. Hein, J. Eisert, and H. J. Briegel, in *Physical Review A*, 69, 062311 (2004), incorporated herein by reference in its entirety.

In its embodiments, the present invention achieves increased efficiency of QC cluster construction by identifying a useful equivalence class of cluster configurations, represented by equivalent graph states. One-dimensional clusters are not sufficient for universal QC, as their geometry does not provide the implementation of two-qubit logic gates. The present invention includes an efficient method of constructing two-dimensional clusters, which allow universal quantum computation to be executed.

B. Single-Qubit Measurement and Fusion of Cluster States

In cluster-based QC, single-qubit measurements on a cluster state of appropriate size and layout can simulate effectively any quantum circuit. Performing a certain measurement on an entangled qubit leaves the remaining qubits in a cluster state with a different layout. The resultant layout is a step closer to the final step of the quantum computation, in which all but a specified set of nodes in the cluster have been measured. The state of these specified nodes, after all the measurements have been completed, comprises the output of the computation.

FIGS. 1A-1C illustrate the effect of $\sigma_z$, $\sigma_x$, and $\sigma_y$ eigenbasis measurements on an example of a one-dimensional linear cluster (or "chain").

FIG. 1A shows a linear chain 100 consisting of qubits 1, 2, and 3, and bonds 115, 120, 121, and 116. Bonds 115 and 116 are possibly connecting qubit 1 and qubit 3 respectively to some other qubits (not shown), indicating that the linear chain 100 may be a portion of a larger chain. Bond 120 connects qubits 1 and 2, and bond 121 connects qubits 2 and 3. Note that the bonds do not represent physical connections, but are indicative of entanglement between the two connected qubits. A $\sigma_z$ eigenbasis measurement breaks all bonds between the measured qubit and the rest of the cluster, removing the measured qubit. For example, $\sigma_z$ measurement on qubit 2 results in the formation of two new disjointed clusters 101 and 102, as qubit 2 is removed. Newly formed cluster 101 is terminated at qubit 1. Qubit 1 may retain all the bonds associated with it prior to the measurement except bond 120. For example, qubit 1 may be connected to other qubits from a larger chain, as bond 115 is intact. Similarly, qubit 3 of cluster 102 may be connected to other qubits to from a larger chain, as bond 116 is intact.

FIG. 1B illustrates that a $\sigma_x$ eigenbasis measurement on a linear chain removes the measured qubit and causes the neighboring qubits to be joined such that they now represent a single logical qubit with a different logical basis. For example, $\sigma_z$ eigenbasis measurement on qubit 2 of linear chain 100 creates a modified linear chain 104 containing new qubit 2' with a different logical basis. Bonds 120 and 121 are removed, while bonds 115 and 116 remain.

FIG. 1C illustrates that a cry eigenbasis measurement on a linear chain removes the measured qubit, but links the qubits to which the measured qubit was previously connected. For example, a $\sigma_y$ eigenbasis measurement on qubit 2 in linear chain 100 removes the measured qubit 2, resulting in a modified linear chain 106, comprising qubits 1 and 3, connected by bond 107. Bonds 115 and 116 remain intact.

FIG. 1D illustrates the non-deterministic type-I fusion operation. Linear chain 108, comprising qubits 1 and 2, and linear chain 112, comprising qubits 2' and 3 are arranged such that end qubit 2 of linear chain 108 and end qubit 2' of linear chain 112 may be fused together (indicated by the dashed box 110 enclosing qubits 2 and 2') to form a single modified linear chain 150, comprising qubits 1, $2^+$, and 3. Fused qubit $2^+$ inherits previous cluster state bonds 161 and 162. Bonds 115 and 116 remain unchanged.

In case of photonic computational clusters, type-I fusion was introduced by Rudolph and Browne. It is a parity check operation implemented by mixing two modes of a polarizing beam splitter (PBS), and rotating one of the output modes by 45° before measuring it with a polarization discriminating photon counter. FIG. 2A shows the hardware implementation of type-I fusion. Polarizing beam splitter 202 receives first beam 210 with a certain spatial mode, and second beam 212 with another spatial mode different from the spatial mode of the first beam 210. For example, PBS 202 mixes vertical polarization component of first beam 210 and horizontal polarization component of second beam 212, to produce output beam 214. Output beam 214 then passes through a waveplate 204a, which rotates the polarization of beam 214 by 45°. A photon discriminating counter 206 receives rotated output beam 216. When only one photon is detected (occurring with a probability of 50%), the initially separated cluster qubits become a single fused cluster qubit inheriting the cluster state bonds of the two qubits which were input. Thus, if type-I fusion is applied to the end qubits of linear chains of length 'n' and 'm', successful outcomes generate a linear chain of length (n+m−1).

While type-I fusion operation joins the end qubits of two linear chains, type-II fusion operation may fuse intermediate qubits from two linear chains to form a two-dimensional cluster with a crosslike layout.

Figure 2B:
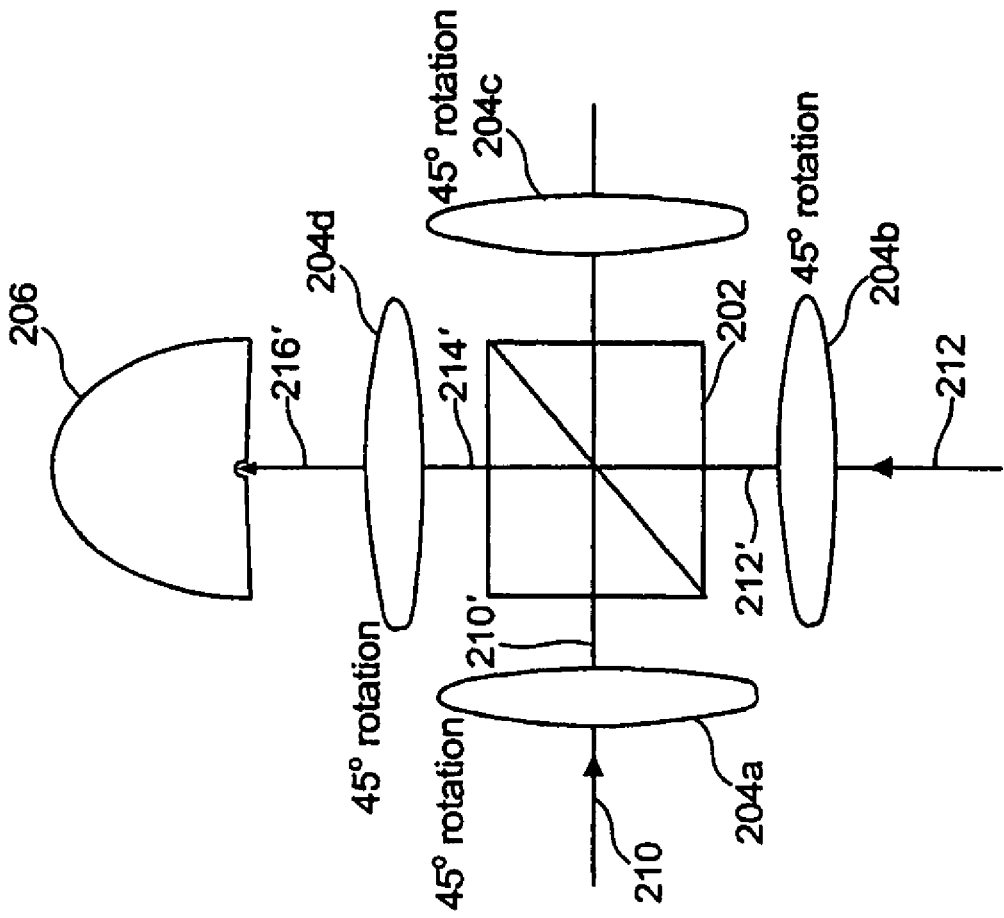
FIGS. 2A and 2B are simplified schematic diagrams for realizing type-I and type-II fusion respectively on entangled photonic qubits.
Figure 2A:
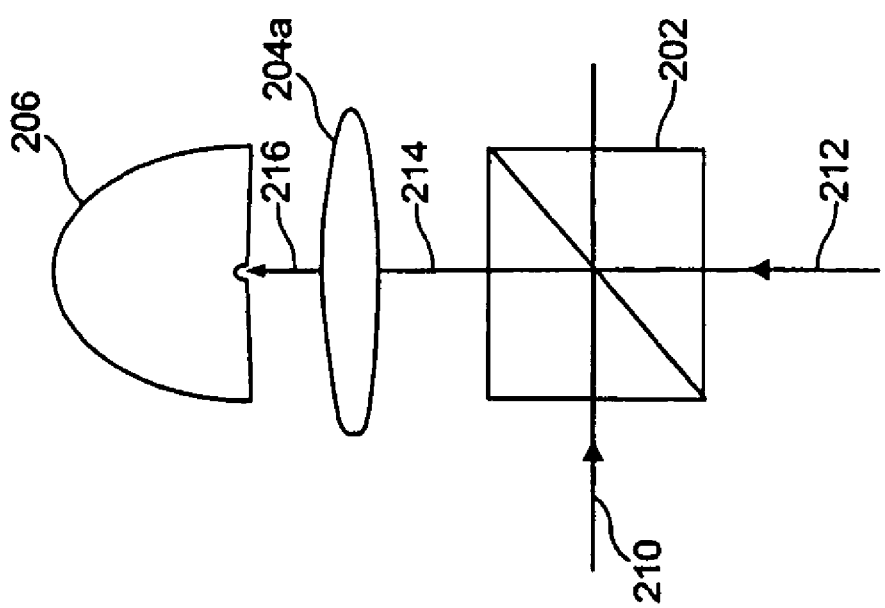

FIG. 2B shows the hardware implementation of type-II fusion, another form of qubit fusion introduced by Rudolph and Browne. Type-II fusion is obtained from type-I fusion by adding 45° rotations to each of the input modes, and measuring the output mode in the rotated basis. As shown in FIG. 2B, PBS 202 receives rotated input beam 210', which is obtained when beam 210 passes through waveplate 204a. PBS 202 also receives rotated input beam 212', which is obtained when beam 212 passes through waveplate 204b. PBS 202 mixes the two beams 210' and 212', and outputs beam 214', which passes through polarization rotator 204d, and rotated output beam 216' is detected by a photon detector 206. Similar to type-I fusion, the probability of detecting a photon of a certain type of polarization is 50%, as type-II is a non-deterministic process. Note that when the type-II fusion operation fails, qubits are effectively lost from the cluster chain.

Embodiments of the present invention make use of the properties of equivalent graph states under local unitaries and graph isomorphisms, and combine that with the use of type-I fusion operations. Use of resource-costly type-II fusion operations is generally avoided. The present approach results in a significant increase in cluster construction efficiency. In particular, it is shown that the present approach is more efficient, in terms of resources used, than that of Browne and Rudolph's approach using type-II fusion operations.

II. Formation of Example Two-Dimensional Basic Clusters

The following sections describe how to build two-dimensional QC clusters of certain basic shapes, which may be used as building blocks for larger two-dimensional clusters. In general, in order to build the basic shapes, one (or more, if required) linear chain is selected, and a number of qubits are arranged in a layout that facilitates subsequent local unitary transformations, such as a Hadamard rotation on a single qubit, and a swapping operation between two qubits. The action of a Hadamard rotation on the j-th qubit is denoted by the symbol $H_j$. Hadamard rotation is a one-qubit rotation, mapping the qubit basis states to two superposition states with equal weight of the computational basis states. The symbol $SWAP_{j-k}$ denotes the swap operation acting on qubits j and k, which can be realized by simply re-labeling the qubits, interchanging their previous labels.

A. Formation of L-Shape

FIG. 3A shows a graphical equivalence that leads to the construction of an L-shaped two-dimensional cluster. A 4-qubit linear chain 300, containing consecutive qubits 1, 2, 3, and 4 is equivalent to a 2×2 box cluster 304, after undergoing two Hadamard rotations and a swap operation. We note that linear chain 300 is topologically, and quantum computationally, equivalent to a two-dimensional cluster chain 302. Applying $H_2 \otimes H_3$ (where the symbol '⊗' denotes tensor multiplication of operators on the corresponding qubits) to the 4-qubit cluster chain 302 and exchanging the labels of qubits 2 and 3, i.e. applying $SWAP_{2,3}$ denoted by the arrows 306 and 307, effectively adds a bond 305 between qubits 1 and 4. Thus, box cluster 304 is formed.

Note that FIG. 3A depicts a transformation that involves only the four qubits shown in the linear chain 300. In FIG. 3B, this transformation is extended by embedding the 4-qubit linear chain 300 in a larger linear chain 308 of arbitrary size. Here the chain extends arbitrarily far in both directions. The presence of the extensions in both directions of the initial chain in FIG. 3B reflects the existence of additional entanglement correlations between qubits 1 and 4 and the qubits along the chain extensions. Thus, the "box construction" method shown in FIG. 3A is extended to obtain a "box-on-a-chain construction" method. The "box-on-a-chain construction" method is then applied to the problem of generating generic clusters suitable for carrying out universal QC.

Starting with linear chain 308, qubits 1, 2, 3, and 4 are arranged in the form of cluster chain 302, embedded in the composite chain 322. Composite chain 322 is then transformed to box-on-a-chain cluster 324 by applying $H_2 \otimes H_3$, followed by $SWAP_{2,3}$. The newly formed box-on-a-chain two-dimensional cluster 324 preserves additional entanglement correlations. This property is discussed in an article by M. Hein, J. Eisert, and H. J. Briegel, published in *Phys. Rev. A* 69:062311 (2004), which is incorporated herein by reference in its entirety. Applying σz measurement on qubit 2 results in the deletion of bonds 312 and 314 (denoted by the 'X' marks), as shown in transitional box cluster 310 embedded in cluster 326. Finally, L-shaped cluster 318 is formed with qubits 1, 3, and 4 arranged such that qubits 1 and 4 are extended in both directions in the form of a larger L-shaped cluster 328.

The L-shaped lattice serves as a standard figure of-merit with which to measure the efficiency of the construction of general quantum computational clusters. Note that construction of L-shaped cluster 328 requires no probabilistic operations, and carries a net cost of only two cluster chain bonds. In contrast, Browne and Rudolph use the probabilistic type-II fusion operation to build the L-shape, requiring on average eight bonds from previously constructed cluster chains The above discussed technique for constructing the basic L-shape cluster "building blocks" is generic for any type of qubits, and not specific to photonic qubits. In order to yield a complete, integrated method of efficiently constructing general photonic clusters capable of universal QC, this method of constructing L-shapes can be combined with the type-I fusion operation of Browne and Rudolph. The integrated cluster generation method is significantly more efficient than previously proposed approaches. The increased efficiency derives from the improved efficiency of L-shape generation technique as compared to the costly technique based on the use of type-II fusion operations, which are not needed in the present approach.

B. Formation of Cross-Shape

Figure 4:
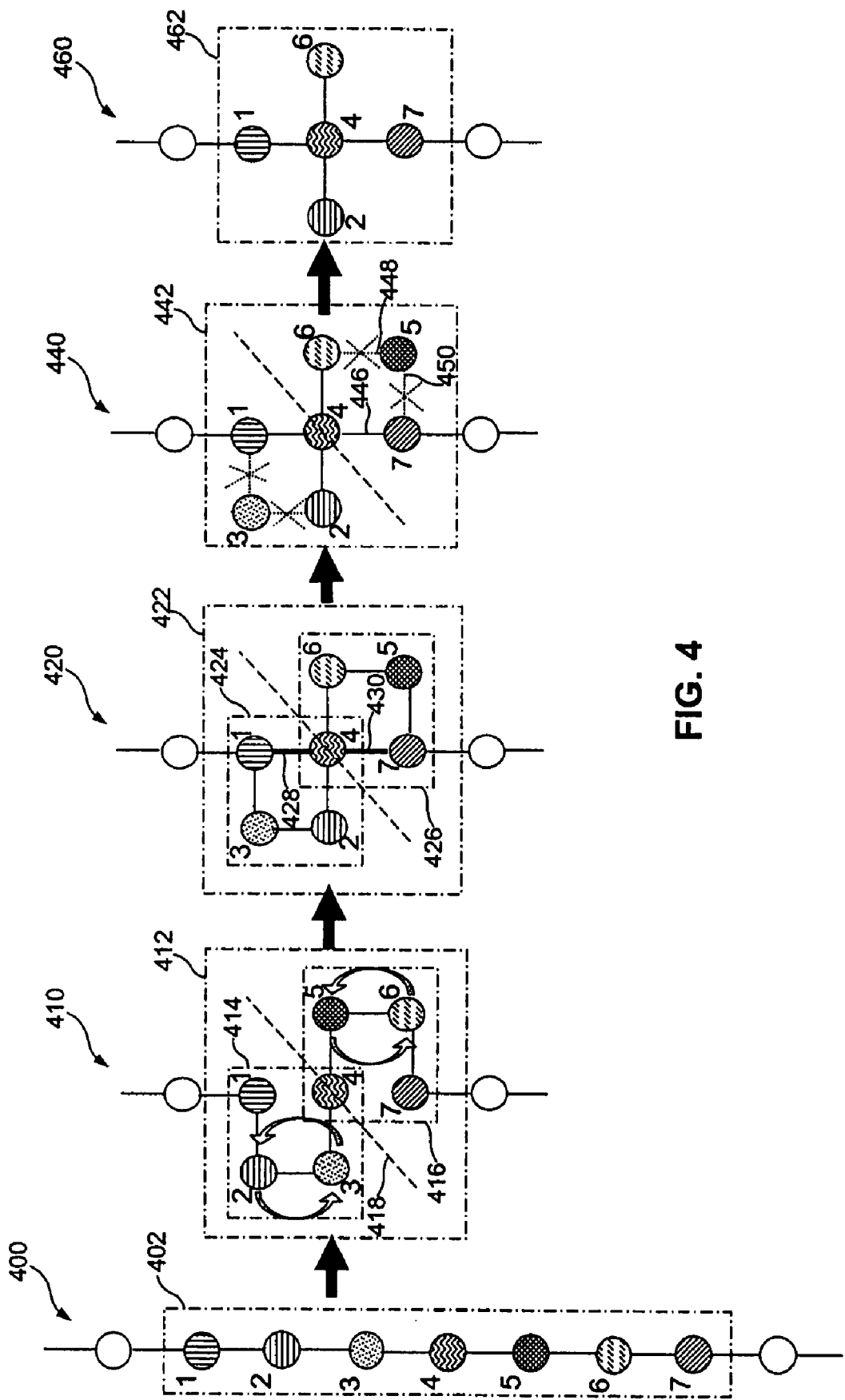
FIG. 4 shows different steps for constructing a cross-shaped cluster, according to an embodiment of the present invention.

FIG. 4 shows an example embodiment, where a linear chain can be deterministically transformed into a cross shape. The method starts with an initial linear chain 400 of arbitrary length, a portion 402 of which containing qubits 1, 2, 3, 4, 5, 6, and 7 is selected. We note that 400 is topologically, and quantum computationally, equivalent to 410, which contains the embedded cluster chain 412. Cluster chain 412 contains two open-box linear clusters 414 and 416. Graphically, open-box linear cluster 414 and 416 are mirror images of each other with respect to the diagonal axis 418. Applying Hadamard rotations to qubits 2 and 3, and qubits 5 and 6 (i.e. applying $H_2 \otimes H_3 \otimes H_5 \otimes H_6$), followed by swapping qubits 2 and 3, and qubits 5 and 6 (i.e. applying $SWAP_{2,3} \circ SWAP_{5,6}$), a composite cluster 420 is obtained. Effectively, these operations form bond 428 between qubits 1 and 4, and bond 430 between qubits 4 and 7. Composite cluster 420 has two-dimensional cluster 422 embedded in it. Cluster 422 contains box clusters 424 and 426. Subsequent execution of $\sigma_y$ measurements on qubit 3 in box cluster 424 and qubit 5 in box cluster 426 delete bonds 444, 446, 448, and 450, as indicated by the 'X' marks in transitional cluster 442, which is embedded in composite cluster 440. Thus, the desired cross shape 462, embedded in cluster 460, is obtained at a cost of only four bonds. This method involves no probabilistic operations.

C. Formation of H-Shape

Figure 5:
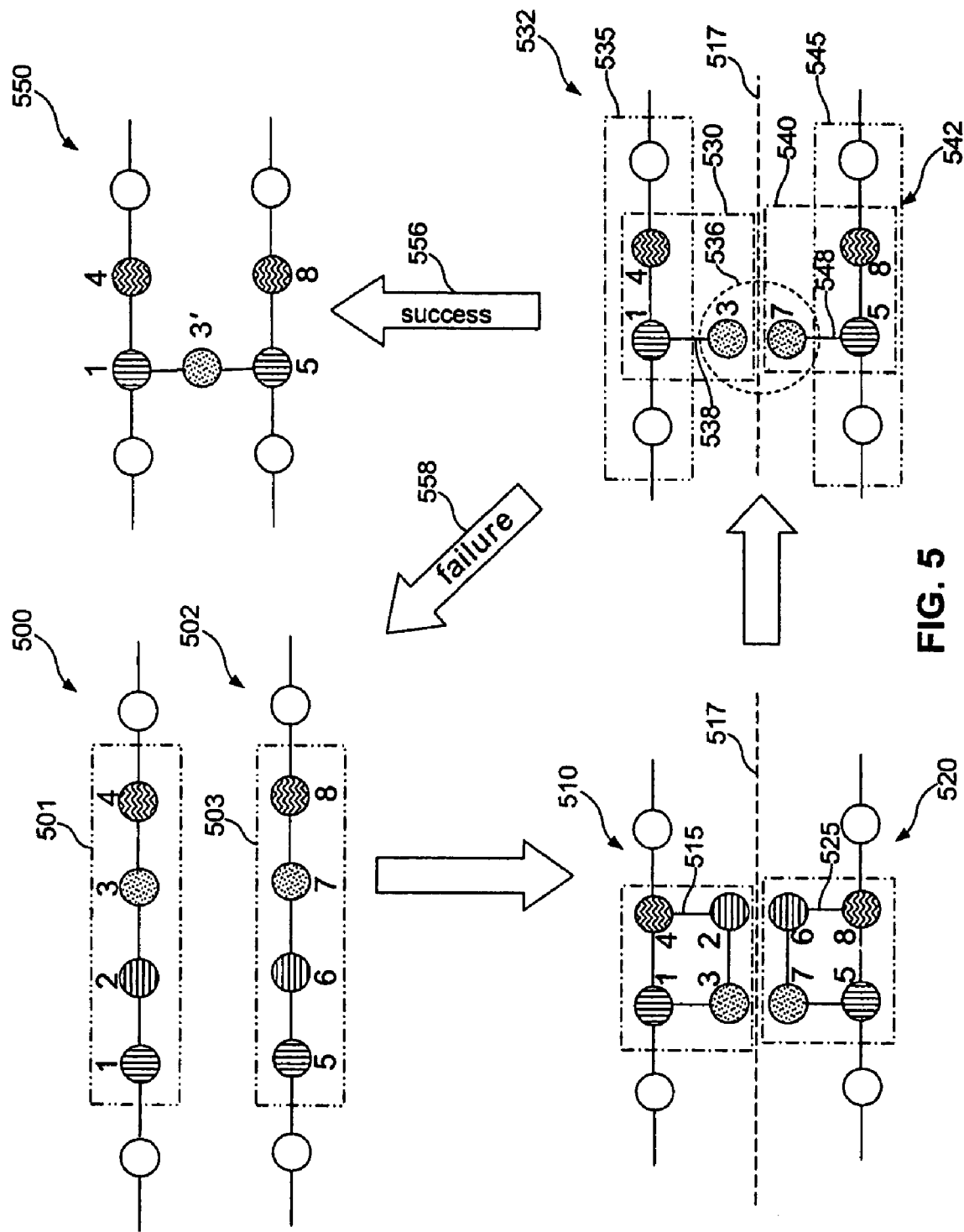
FIG. 5 shows different steps for constructing a sideways H-shaped cluster, according to an embodiment of the present invention.

In addition to executing Hadamard rotations and swap operations on qubits, embodiments of the present invention may also employ type-I fusion operations to create an array of useful computational clusters. FIG. 5 shows such an example.

FIG. 5 shows the general method for constructing a two-dimensional cluster of a particular shape, which is referred to as the "sideways, H-shape" according to an embodiment of the present invention. The sideways H-shape can be used as a basic building block cluster that, when replicated, can create the layout of any equivalent circuit.

In one embodiment, in order to achieve the sideways H-shape, the starting point is selecting two linear chains of arbitrary length, as illustrated by linear chains 500 and 502. Qubits 1, 2, 3, and 4 from linear chain 500 form embedded linear chain 501, and qubits 5, 6, 7, and 8 from linear chain 502 form embedded linear chain 503. Initial linear chain 500 is transformed into a box-on-a-chain cluster 510, using the method described above with reference to FIG. 3B. Applying Hadamard rotation on qubits 2 and 3, followed by swapping qubits 2 and 3 results in the construction of 2×2 box cluster 515. Similarly, initial linear chain 502 is transformed into a the box-on-a-chain cluster 520, using the method described above with reference to FIG. 3B. Applying Hadamard rotation on qubits 6 and 7, followed by swapping qubits 6 and 7 results in the construction of 2×2 box cluster 525. Graphically, cluster 510 and cluster 520 are mirror images of each other with respect to the axis 517, parallel to the initial chains.

In the next step, an L-shaped cluster 530 is generated by applying $\sigma_z$ measurement on qubit 2. In a similar manner, cluster 525 is transformed into an L-shaped cluster 540 when $\sigma_z$ measurement is applied on qubit 6. Clusters 530 and 540 are embedded in larger L-shaped clusters 532 and 542 respectively, each of which is extending arbitrarily in both directions. These deterministic transformations of the linear chains to the L-shaped clusters cost two bonds for each L-shaped cluster, i.e. a net cost of four bonds.

After the two L-shaped clusters 532 and 542 are formed, they are attempted to be fused, making use of the type-I fusion operation of Browne and Rudolph to form the desired two-dimensional H-shaped cluster 550. Since the type-I fusion operation succeeds with a probability of ½, there are two possible outcomes, as described below.

If the joining operation succeeds as shown by arrow 556, i.e. qubits 3 and 7 are fused using type-I fusion operation 536 (indicated by the dashed oval enclosing qubits 3 and 7), then fused qubit 3' is created joining the two clusters. The operation is now complete, and the desired two-dimensional cluster 550 has been built at a net cost of four bonds. In contrast, had the initial L-shapes been formed using the non-deterministic type-II fusion operations of Browne and Rudolph, the average net cost of the two-dimensional cluster would have been eight bonds for each L-shape, or sixteen bonds for the desired sideways H-shape.

Conversely, if the joining operation fails as shown by arrow 558, L-shaped cluster 532 reverts to a chain 535, and L-shaped cluster 542 reverts to a chain 545, incurring a net additional cost of two bonds 538 and 548. Chain 535 is equivalent to initial chain 501, and chain 545 is equivalent to chain 503. Thus, failure of the fusion operation results in effectively returning to the initial state with two parallel linear chains 500 and 502. The process described above is then iterated, beginning with the new chains 535 and 545 that resulted from the failure of the attempted joining operation, until success is achieved. Upon such iteration, the average net cost for a successful outcome is ten bonds if the initial and subsequent chains are transformed into L-shapes using type-I fusion, but the average net cost would have been thirty four bonds had the various chains been transformed into L-shapes using the type-II fusion operation of Browne and Rudolph.

It is to be noted that H-shapes are comprised of a single "rung" connecting two chains. In embodiments of the present invention, these H-shapes can be grown into "sideways ladder" shapes that possess additional rungs, by repeatedly applying the above discussed method along the length of an initial H-shape. In additional embodiments, two-dimensional clusters with greater depth than an H-shape (or a sideways ladder) can be built by adjoining parallel chains to a given H-shaped cluster. This is done, one depth level at a time, by applying the present method to a given additional chain and either of the "outer" sides of the starting H-shape. In this way, making use of the technique for creating basic L-shapes out of linear chains, a two-dimensional cluster of any complexity can be formed, with a significant increase in efficiency compared to previous approaches. More general H-shapes (and more general "sideways ladder" shapes), in which the rungs connecting adjacent chains include more than one qubit node, are constructed by adjoining modified L-shapes that have been augmented using type-I fusion operations to incorporate additional qubit nodes. In addition, simple bonds are constructed by connecting adjacent chains (i.e., "nodeless rungs"), i.e. by removing nodes as required using $\sigma_y$ measurements.

III. Formation of Arbitrarily-Shaped Clusters

The cluster construction method employed by embodiments of the present invention uses only local unitary rotations and type-I fusion operations. Type-II fusion operations are neither needed nor used, which results in a significant increase in the efficiency of photonic cluster construction as discussed above. Although the present method makes no use of type-II fusion operations, this does not compromise the generality or diminish the flexibility of the method. As an illustration of this flexibility, an assortment of typical cluster shapes that can be constructed making use only of local unitaries and type-I fusion operations is discussed.

FIG. 6-8 show more examples of creating different two-dimensional building block clusters.

In FIG. 6, a 7-qubit cluster chain 600 is shown, having a layout that facilitates subsequent operations. A two-dimensional cluster 605 is obtained by applying $H_2 \otimes H_3 \otimes H_5 \otimes H_6$, followed by $SWAP_{2,3} \circ SWAP_{5,6}$ to cluster chain 600. Cluster 605 can then be used as an alternative to the previously discussed L-shape as a basic building block to construct general two-dimensional clusters. To illustrate the use of cluster 605 as a building block for more general cluster shapes, another cluster 609 is selected. Clusters 605 and 609 are graphical mirror images of each other with respect to axis 607. Qubit 1 of cluster 605 and qubit 1' of cluster 609 are fused together using a type-I fusion (indicated by the dashed oval 616). Similarly, qubit 6 of cluster 605 and qubit 6' of cluster 609 are fused together using a type-I fusion (indicated by the dashed oval 614).

If both the fusion operations are successful, then a resultant cluster 630 is formed. On the other hand, if fusion operation 614 fails, then bonds 620, 622, 624, and 626 are removed, and cluster 640 results.

FIG. 7 shows that cluster 640 may be used to attempt to build a cluster 740, going either through intermediate cluster 710 or through intermediate cluster 730. The process starts by using type-I fusion operations to fuse qubits 5 and 5' in cluster 640 (indicated by dashed oval 705). Since type-I fusion succeeds with probability 50%, there are two possible outcomes. If the type-I fusion operation succeeds, then cluster 710 is created. Then $\sigma_y$ measurements on qubits 7 and 7' in cluster 710 are performed, resulting in deterministically (i.e., with 100% probability) producing the desired cluster 740. If the initial type-I fusion operation 705 fails, cluster 730 is produced. type-I fusion is then applied to qubits 7 and 7' (in dashed oval 735) of cluster 730. If type-I fusion operation 735 succeeds, the desired cluster 740 is produced. If type-I fusion operation 735 fails, the basic structure equivalent to cluster 605 (see FIG. 6) is recovered.

Further exploring the approach to generate basic clusters, it is noted that the cluster shapes in FIG. 8 are generically useful. Cluster shape 800 illustrated in FIG. 8 may be deterministically constructed by starting with a 10-qubit chain and applying suitable Hadamard and swap operations by analogy with the transformation of a 7-qubit chain into the shape of cluster 605 (shown in FIG. 6). The useful cluster 810 depicted in FIG. 8 is obtained as follows. Beginning with a 9-qubit linear chain, the ends are joined using type-I fusion to obtain an 8-qubit ring. If this operation succeeds, Hadamard operations on qubits 1,4,5 and 8 are applied, followed by $\text{SWAP}_{1,5} \circ \text{SWAP}_{4,8}$, resulting in cluster 810.

IV. Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method of constructing an L-shaped two-dimensional quantum computational cluster that provides a basis for constructing cluster architectures suitable for carrying out universal quantum computation, comprising:
    (a) selecting a first qubit, a second qubit, a third qubit, and a fourth qubit from a first linear chain containing at least four qubits, wherein the first qubit, the second qubit, the third qubit, and the fourth qubit are arranged consecutively along the first linear chain;
    (b) constructing a first 2×2 box cluster containing the first qubit, the second qubit, the third qubit, and the fourth qubit, wherein said construction comprises:
        (1) applying Hadamard rotations to the second qubit and the third qubit; and
        (2) applying a swap operation between the second qubit and the third qubit to create a bond between the first qubit and the fourth qubit; and
    (c) measuring the second qubit, thereby deleting bonds between the second and third qubits and between the second and fourth qubits to create the L-shaped two-dimensional quantum computational cluster.

2. The method of claim 1, wherein the qubits comprise photonic qubits, and the L-shaped two-dimensional quantum computational cluster comprises a photonic computational cluster.

3. The method of claim 1, wherein said measuring step (c) uses $\sigma_z$ measurement.

4. The method of claim 1, wherein the L-shaped two-dimensional quantum computational cluster is used as a building block to create arbitrarily shaped larger computational clusters by applying one or more measurements and fusion operations involving at least one additional qubit outside the L-shaped two-dimensional quantum computational cluster.

5. The method of claim 4, wherein the measurements include one or more of $\sigma_x$, $\sigma_y$, and $\sigma_z$ measurements.

6. The method of claim 4, wherein the fusion operations include type-I and type-II fusion.

7. The method of claim 4, wherein the fusion operations include only type-I fusion.

8. The method of claim 1, further comprising:
    (d) selecting a fifth qubit, a sixth qubit, a seventh qubit, and an eighth qubit from a second linear chain containing at least four qubits, wherein the fifth qubit, the sixth qubit, the seventh qubit, and the eighth qubit are arranged consecutively along the second linear chain;
    (e) constructing a second 2×2 box cluster containing the fifth qubit, the sixth qubit, the seventh qubit, and the eighth qubit, wherein said construction comprises:
        (1) applying Hadamard rotations to the sixth qubit and the seventh qubit; and
        (2) applying a swap operation between the sixth qubit and the seventh qubit to create a bond between the fifth qubit and the eighth qubit,
    wherein the second 2×2 box cluster and the first 2×2 box cluster are axial mirror images of each other with the third qubit and the seventh qubit adjacent to each other;
    (f) measuring the sixth qubit, thereby deleting bonds between the sixth and seventh qubits and between the sixth and eighth qubits;
    (g) applying a type-I fusion operation to fuse the third qubit and the seventh qubit, thereby constructing an H-shaped two-dimensional quantum computational cluster.

9. The method of claim 8, wherein the qubits comprise photonic qubits, and the H-shaped two-dimensional quantum computational cluster comprises a photonic computational cluster.

10. The method of claim 8, wherein the measuring steps (c) and (f) use $\sigma_z$ measurements.

11. The method of claim 8, wherein the H-shaped two-dimensional quantum computational cluster is used as a building block to create arbitrarily shaped larger computational clusters by applying one or more measurements and fusion operations involving at least one additional qubit outside the H-shaped two-dimensional quantum computational cluster.

12. The method of claim 8, wherein if the type-I fusion operation fails in step (g), then a third 2×2 box cluster is constructed from a third linear chain that comprises the first and the fourth qubits, and a fourth 2×2 box cluster is constructed from a fourth linear chain that comprises the fifth and the eighth qubits, wherein the third and the fourth linear chains result from the failure of the type-I fusion operation in step (g).

13. A method of constructing a cross-shaped two-dimensional quantum computational cluster that provides a basis for constructing cluster architectures suitable for carrying out universal quantum computation, comprising:
   (a) selecting a first qubit, a second qubit, a third qubit, a fourth qubit, a fifth qubit, a sixth qubit, and a seventh qubit from a linear chain containing at least seven qubits, wherein the first qubit, the second qubit, the third qubit, the fourth qubit, the fifth qubit, the sixth qubit, and the seventh qubit are arranged consecutively along the first linear chain;
   (b) constructing a first 2×2 box cluster containing the first qubit, the second qubit, the third qubit, and the fourth qubit, wherein said construction comprises:
      (1) applying Hadamard rotations to the second qubit and the third qubit; and
      (2) applying a swap operation between the second qubit and the third qubit to create a bond between the first qubit and the fourth qubit;
   (c) constructing a second 2×2 box cluster containing the fourth qubit, the fifth qubit, the sixth qubit, and the seventh qubit, wherein said construction comprises:
      (3) applying Hadamard rotations to the fifth qubit and the sixth qubit; and
      (4) applying a swap operation between the fifth qubit and the sixth qubit to create a bond between the seventh qubit and the fourth qubit,
   wherein the second 2×2 box cluster and the first 2×2 box cluster are diagonal mirror images of each other with the third qubit and the fifth qubit diametrically opposite to each other;
   (d) measuring the third qubit, thereby deleting bonds between the third and second qubits and between the third and first qubits; and
   (e) measuring the fifth qubit, thereby deleting bonds between the fifth and the sixth qubits and between the fifth and seventh qubits to create the cross-shaped two-dimensional quantum computational cluster.

14. The method of claim 13, wherein the qubits comprise photonic qubits, and the cross-shaped two-dimensional quantum computational cluster comprises a photonic computational cluster.

15. The method of claim 13, wherein the measuring steps (d) and (e) use $\sigma_c$ measurements.

16. The method of claim 13, wherein the cross-shaped two-dimensional quantum computational cluster is used as a building block to create arbitrarily shaped larger computational clusters by applying one or more measurements and fusion operations involving at least one additional qubit outside the cross-shaped two-dimensional quantum computational cluster.

17. The method of claim 16, wherein the measurements include one or more of $\sigma_x$, $\sigma_y$, and $\sigma_z$ measurements.

18. The method of claim 16, wherein the fusion operations include type-I and type-II fusion.

19. The method of claim 4, wherein the fusion operations include only type-I fusion.

* * * * *